United States Patent
Derras et al.

(10) Patent No.: US 9,590,803 B2
(45) Date of Patent: Mar. 7, 2017

(54) TIMING ERROR PROCESSOR THAT USES THE DERIVATIVE OF AN INTERPOLATOR FUNCTION

(71) Applicant: Seagate Technology LLC, Cupertino, CA (US)

(72) Inventors: Belkacem Derras, Longmont, CO (US); Raman Venkataramani, Longmont, CO (US); William Michael Radich, Longmon, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 36 days.

(21) Appl. No.: 14/720,568

(22) Filed: May 22, 2015

(65) Prior Publication Data
US 2016/0344540 A1 Nov. 24, 2016

(51) Int. Cl.
H04L 27/00 (2006.01)
H04L 7/04 (2006.01)
H04L 27/227 (2006.01)
H04L 7/027 (2006.01)

(52) U.S. Cl.
CPC .............. *H04L 7/048* (2013.01); *H04L 7/027* (2013.01); *H04L 27/2271* (2013.01)

(58) Field of Classification Search
CPC ....... H04L 7/0008; H04L 7/02; H04L 7/0337; H04L 7/0334; H04L 27/2647; H04L 1/06; H04L 25/03057; H04B 1/1027
USPC .................................. 375/346–348, 354–355
See application file for complete search history.

(56) References Cited

U.S. PATENT DOCUMENTS

| | | | | |
|---|---|---|---|---|
| 5,724,396 A | * | 3/1998 | Claydon | H04L 1/0054 375/355 |
| 5,771,127 A | * | 6/1998 | Reed | G11B 20/10009 360/40 |
| 6,493,403 B1 | | 12/2002 | Ashley et al. | |
| 6,985,549 B1 | * | 1/2006 | Biracree | H04L 7/0004 375/355 |
| 7,564,931 B2 | | 7/2009 | Venkataramani et al. | |
| 2009/0097535 A1 | * | 4/2009 | Hutchins | G11B 20/10009 375/227 |

OTHER PUBLICATIONS

Aziz, "Symbol Rate Timing Recovery for Higher Order Partial Response Channels", Journal on Selected Areas in comm., vol. 19, No. 4, Apr. 2001, pp. 635-648.
Bergmans, "Digital Baseband Transmission and Recording", Academic Publishers, Chap. 9-11, 1996.
Christiansen, "Modeling of a PRML Timing Loop as a Kalman Filter", Global Telecomm. Conf., vol. 2, 1994, pp. 1157-1161.
(Continued)

*Primary Examiner* — Janice Tieu
(74) *Attorney, Agent, or Firm* — Hollingsworth Davis, LLC

(57) ABSTRACT

A digitized signal is processed via an interpolator. The interpolator performs timing adjustment on the digitized signal. The error signal is determined based on a desired signal and the time-adjusted digitized signal. A corrective phase shift of the digitized signal is determined via a least-mean-squared processing block that uses the error and the derivative of a function used by the interpolator. The corrective phase shift is input to the interpolator to perform the timing adjustment.

20 Claims, 8 Drawing Sheets

(56) References Cited

OTHER PUBLICATIONS

Driessen, "DPLL bit Synchronizer with Rapid Acquisition Using Adaptive Kalman Filtering Techniques", IEEE Trans. on Comm., vol. 42, No. 9, Sep. 1994, pp. 2673-2675.
Gardner, "A BPSK/QPSK Timing-Error Detector for Sampled Receivers", IEEE Trans. on Comm., vol. Com-34, No. 5, May 1986, pp. 423-429.
Godard, "Passband Timing Recovery in All-Digital Modem Receiver", IEEE Trans. on Comm., vol. Com-26, No. 5, May 1978, pp. 517-523.
Muller et al., "Timing Recovery in Digital Synchronous Data Receivers", IEEE Trans. on Comm., vol. Com-24, No. 5, May 1976, pp. 516-531.
Patapoutian, "On Phase-Locked Loops and Kalman Filters", IEEE Trans. on Comm., vol. 47, May 1999, pp. 670-672.
Patapoutian, "Application of Kalman Filters with a Loop Delay in Synchronization", IEEE on Comm., vol. 50, No. 5, May 2002, pp. 703-706.
Shafiee, "Timing Recovery for Sampling Detectors in Digital Magnetic Recording", IEEE, 1996, pp. 577-581.
Venkataramani et al., "MAP-Based Timing Recovery for Magnetic Recording", International Conference on Communications, Beijing China, May 2008, 4 pages.

\* cited by examiner

TIMING ERROR PROCESSOR THAT USES THE DERIVATIVE OF AN INTERPOLATOR FUNCTION

SUMMARY

The present disclosure is related to a timing error processor that uses the derivative of an interpolator function. In one embodiment, a digitized signal is processed via an interpolator, the interpolator performing timing adjustment on the digitized signal. The error signal is determined based on a desired signal and the time-adjusted digitized signal. A corrective phase shift of the digitized signal is determined via a least-mean-squared processing block that uses the error and the derivative of a function used by the interpolator. The corrective phase shift is input to the interpolator to perform the timing adjustment.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to re-timing of analog-to-digital (ADC) samples of data signals, e.g., signals that are read from data storage media. In some systems, e.g., those that use minimal or no oversampling, the signal should be sampled at appropriate instants in time to ensure efficient detection of encoded data. Due to factors such as frequency drift in clocks, variations in the media and read/write heads, thermal effects, etc., the timing of a signal can vary as it is received at the ADC. As a result, the timing offset of a sampled signal may be continuously adjusted to ensure that the eye diagram of the equalized samples is widely open for reliable detection.

Several timing recovery methods may be used depending on the system in which the recovery is used. The choice of the timing method may depend on several factors such as 1) the implementation complexity, 2) whether the method is data-aided or non-data-aided, 3) whether the signal is bandpass or baseband, 4) whether the signal is baud-rate or oversampled, 5) whether the timing loop is applied before or after the equalizer, 6) whether the timing information is extracted before or after the sampler/ADC, and 7) desired performance criterion.

In the present disclosure, two minimum-mean-square error (MMSE)-based schemes are described to perform timing adjustment on baud-rate samples. The first scheme, called pre-equalizer, performs the retiming of the ADC samples (through interpolation) using a timing error derived from the ADC samples and an error between a reference signal and the ADC samples. The second scheme, called post-equalizer, performs the retiming of the ADC samples (through interpolation) using a timing error derived from equalized samples and an error between a reference signal and the equalized samples.

The reference signals used to generate the error signals in both cases are different. In the pre-equalizer case, the reference signal is based on the channel impulse response, whereas in the post-equalizer case, the reference signal is based on the front-end target that is used for partial response equalization. In the pre-equalizer case, the timing error is a function of the reference error and the interpolated ADC samples. However, in the post-equalizer case, the timing error is a function of the reference error and the interpolated equalized samples. The amount of timing error extracted from the incoming signals affects the accuracy of the timing offset adjustment. The more information retrieved from the timing error, the better the accuracy of the timing loop.

Figure 1:
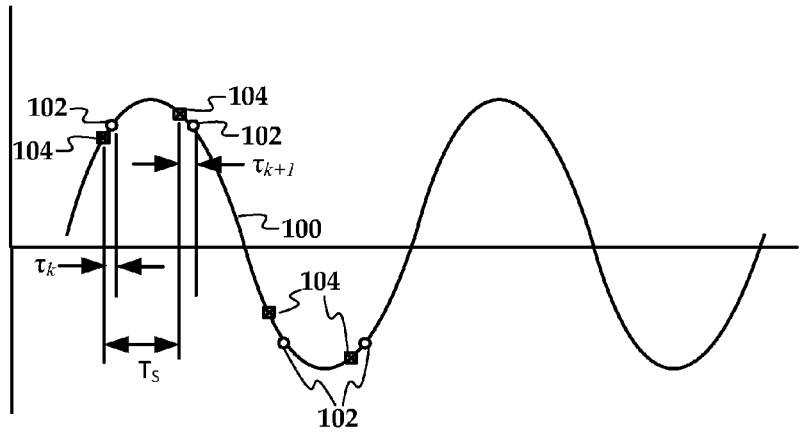
FIG. 1 is a graph illustrating interpolative timing adjustment according to an example embodiment.

Generally, the embodiments described herein utilize interpolation to perform timing adjustment. An example of interpolated timing adjustment is shown in the graph of FIG. 1. Curve 100 represents the analog signal being sampled, and points 102 represent ideal sample locations along the curve 100. Because there will be variations in phase and/or frequency between the signal samples and the sampling clock, the actual samples are indicated by points 104. The values of $\tau$ represent timing offsets (phase shifts) between the samples 104 and the desired measuring points 102 of the analog signal 100. In this example, the sampling period $T_s$ corresponds to baud rate sampling, e.g., at the Nyquist frequency, although it will be understood that the concepts described herein may also be adapted to oversampled signals.

In some systems, timing offsets $\tau$ are used to adjust the ADC clock. However, where interpolation is used, an interpolator component uses a filter to produce samples that correct for the timing offsets without needing to adjust the ADC clock. Generally, an interpolation filter uses an integrator (e.g., accumulator, delay line) to process a set of the last samples. An assumption about the form of the sampled signal (such as band-limitedness) is made, and the interpolator attempts to adjust the sample timing to conform to this assumed form using the actual samples received.

Figure 2:
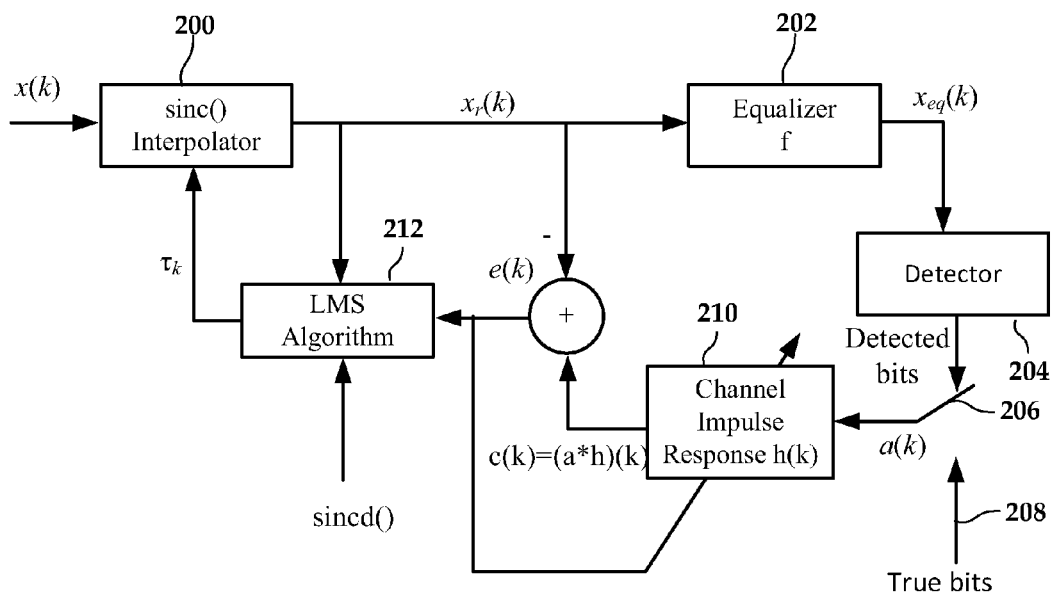
FIG. 2 is a block diagram illustrating a pre-equalizer timing adjustment processor according to an example embodiment.
Figure 3:
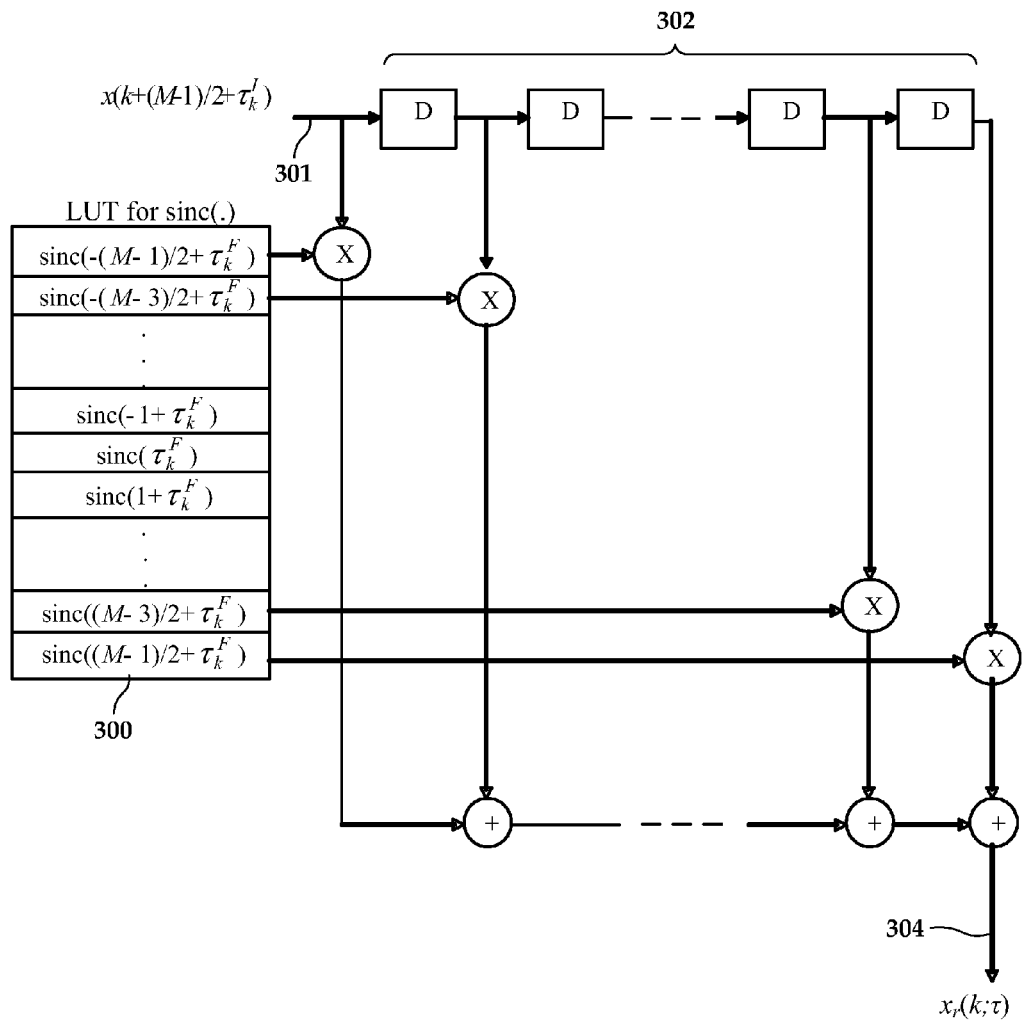
FIG. 3 is a block diagram of an interpolator according to an example embodiment.
Figure 4:
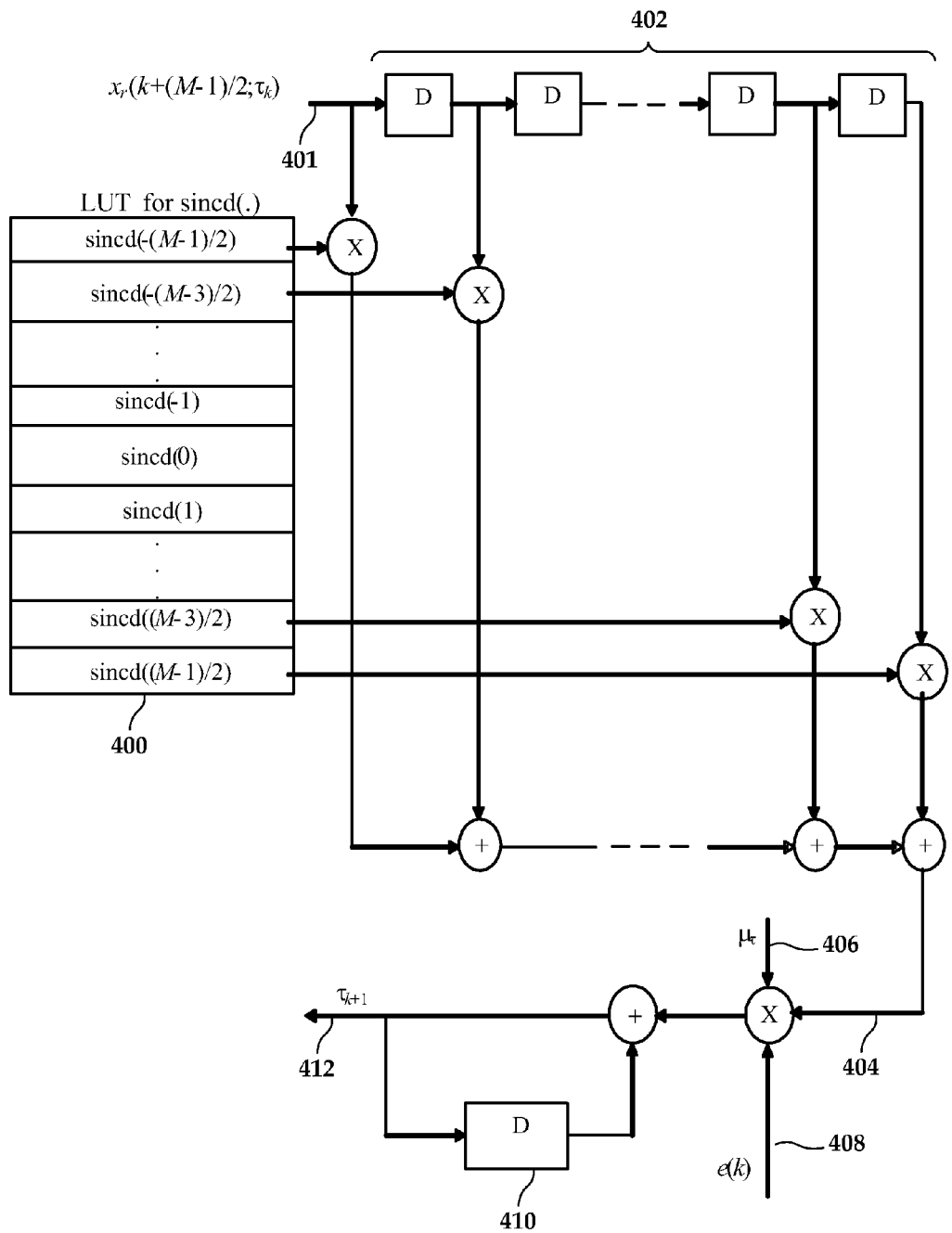
FIG. 4 is a block diagram of a timing offset determination block according to an example embodiment.

The pre-equalizer configurations will first be described, details of which are shown in FIGS. 2-4. In FIG. 2, a block diagram illustrates a pre-equalizer timing adjustment processor according to an example embodiment. An interpolator 200 receives signal samples x(k) from an ADC. The output of the interpolator 200 are timing-corrected samples $x_r(k)$ that are processed by an equalizer 202, e.g., a finite impulse response (FIR) filter. The equalizer 202 compensates for the channel impulse response, the equalized output $x_{eq}(k)$ being input to a detector 204. The detected bits a(k) are fed back for purposes of adjusting the interpolator 200. As indicated by switching element 206, either the detected bits or a known pattern of bits (true bits 208) can be used for this purpose. The true bits 208 can be used during an acquisition phase, when the received signal x(k) is obtained by reading a known pattern of bits (e.g., preamble) used for training.

The bits are convolved with the channel impulse response via block 210 to obtain the desired, pre-equalized and time-adjusted ADC sequence c(k). In this example, the channel impulse response estimated at block 210 is adaptively adjusted. The sequence c(k) is used to derive an error e(k) of the detected signal, the error e(k) is input to a least-mean-squared (LMS) processing block 212. The LMS processing block 212 determines a corrective phase shift $\tau_k$, which is input to the interpolator 200 for performing the timing adjustment. A more detailed discussion of the pre-equalizer timing adjustment algorithm follows.

Generally, the processor in FIG. 2 utilizes an adaptive ADC-retiming algorithm to adjust the timing offset in the ADC samples before they pass through the equalizer 202. Here the adjusted (interpolated) ADC signal $x_r(k;\tau)$ is assumed to have the form shown in Expression (1), where $\tau$ is the timing offset between the ideal clock and the received ADC clock, x(k) is the ADC signal before time-adjustment and $\text{sinc}(i+\tau)$ is the interpolation function, which is defined in Expression (2).

$$x_r(k;\tau) = \sum_i x(k-i)\text{sinc}(i+\tau) \tag{1}$$

$$\text{sinc}(i+\tau) = \frac{\sin[\pi(i+\tau)]}{\pi(i+\tau)} \tag{2}$$

In FIG. 3, a block diagram shows the implementation details of an interpolator that uses a lookup table 300. Input samples 301 are passed through a series of M delay elements 302 (e.g., buffers, accumulators) and are multiplied with entries of the lookup table 300, the multiplication results being summed to form the time corrected value 304. Note that the lookup table is a two-dimensional array in M and $\tau$. The elements in FIG. 3 correspond to the interpolator 200 in FIG. 2, with $\tau_k$ as an input and $x_r(k)$ as the output. The value of M (which is the order of the interpolation filter) can be selected during design of the system, as can be the LMS step sizes.

In order to provide a value of $\tau_k$ that minimizes timing error, the functional of Expression (3) below is minimized with respect to the timing offset $\tau$. As shown in Expression (4a), c(k) is the desired ADC signal given as the convolution of the channel impulse response h(k) of length $L_h$ and the non-return-to-zero (NRZ) bit sequence $\{a(k)\}$.

$$J(\tau) = E[(c(k) - x_r(k;\tau))^2] \tag{3}$$

-continued
$$= E\left[\left(c(k) - \sum_i x(k-i)\text{sinc}(i+\tau)\right)^2\right]$$
$$= E[e^2(k)]$$

$$c(k) = \sum_{i=-(Lh-1)/2}^{(Lh-1)/2} h(i)a(k-i) \tag{4a}$$

Notice here that the NRZ bit sequence $\{a(k)\}$ may be given as the true sequence during the acquisition phase or as a detected sequence from the detector during the tracking phase of the timing recovery. During the acquisition phase, a short sequence of known pattern, called preamble, can be used to start the training. The impulse response tap vector $h^{(k)}=[h(k+(Lh-1)/2), \ldots, h(k+1), h(k), h(k-1), \ldots, h(k-(Lh-1)/2)]^T$ may be estimated adaptively using the LMS algorithm shown in Expression (4b), where $\mu_h$ is the adaptation step size, e(k) is the error between the desired signal c(k) and the time-adjusted (interpolated) signal $x_r(k;\tau)$, as given in (1) and (3), and $a^{(k)}$ is a data vector given as $a^{(k)}=[a(k+(Lh-1)/2), \ldots, a(k+1), a(k), a(k-1), \ldots, a(k-(Lh-1)/2]^T$.

$$h^{(k+1)}=h^{(k)}+\mu_h e(k)a^{(k)} \tag{4b}$$

For the timing offset gradient-based adaptive algorithm, the instantaneous functional in Expression (5) below will be minimized. The gradient of (5) with respect to the parameter $\tau$ is shown in Expression (6), where the function $\text{sincd}(j+\tau)$ is the derivative of $\text{sinc}(j+\tau)$ with respect to $\tau$ and given in (7).

$$J_{ins}(\tau) = (c(k) - x_r(k;\tau))^2 \tag{5}$$
$$= \left(c(k) - \sum_i x(k-i)\text{sinc}(i+\tau)\right)^2$$
$$= e^2(k)$$

$$\frac{\partial J_{ins}(\tau)}{\partial \tau} = 2e(k)\frac{\partial e(k)}{\partial \tau} \tag{6}$$
$$= -2e(k)\left(\sum_i x(k-i)\text{sincd}(i+\tau)\right)$$

$$\text{sincd}(j+\tau)=(\cos[\pi(j+\tau)]-\text{sinc}(j+\tau))/(j+\tau) \tag{7}$$

The adaptive algorithm for estimating the timing offset $\tau$ uses the negative slope towards the minimum of Expression (6) and takes the form shown in Expression (8) below, where $\mu_\tau$ is the step size for the timing offset update. Replacing (6) into (8) will give the relationship in Expression (9a).

$$\tau_{k+1} = \tau_k + \mu_\tau\left(-\frac{\partial J_{ins}(\tau)}{\partial \tau}\right)_{\tau=\tau_k} \tag{8}$$

$$\tau_{k+1} = \tau_k + \mu_\tau e(k) \sum_i x(k-i) \text{sincd}(i + \tau_k) \quad (9a)$$

To operate within the range of the "sincd" lookup table, the expression given by (9a) may be re-written as Expression (10a), where $\tau_k^I$ and $\tau_k^F$ are the integer and the fractional parts of $\tau_k$, respectively, and M is the order of the interpolation filter.

$$\tau_{k+1} = \tau_k + \mu_\tau e(k) \sum_{i=-(M-1)/2}^{(M-1)/2} \text{sincd}(i + \tau_k^F) x(k - i + \tau_k^I) \quad (10a)$$

The function sincd($i+\tau_k^F$), $-(M-1)/2 \le i \le (M-1)/2$, may be tabulated using a quantized version of $\tau_k^F$. In such a case, Expression (10a) becomes Expression (11a) below, where LUT(j,$\tau^F$) is a two-dimensional lookup table that contains the coefficients of Expression (7) for some given timing offset values $\tau^F$.

$$\tau_{k+1} = \tau_k + \mu_\tau e(k) \sum_{i=-(M-1)/2}^{(M-1)/2} LUT(i, \tau_k^F) x(k - i + \tau_k^I) \quad (11a)$$

For instance, if $\tau_k^F$ is quantized with a step of 0.1, then the table LUT(i,$\tau^F$) will contain 10M values for sincd(i+$\tau_k^F$), where for each value of $\tau_k^F$ there are M values of sincd(.). Expressions (9a)-(11a) may be simplified so that only a one-dimensional lookup table for sincd(.) is used. If the timing offset $\tau$ in (9a) is transferred from sincd(.) to the signal x(.), then Expression (9a) becomes Expression (9b), where $x_r(k)$ is the retimed ADC signal. Similar transformation may be applied to (10a) and (11a), which become Expressions (10b) and (11b), respectively. The lookup table LUT(i) in (11b) is in fact a one-dimensional array that contains the M taps of the derivative of the interpolator sincd(i). From (9b)-(11b), the timing error function for the pre-equalizer retiming loop is given by Expression (11c) below.

$$\tau_{k+1} = \tau_k + \mu_\tau e(k) \sum_i x_r(k - i; \tau_k) \text{sincd}(i) \quad (9b)$$

$$\tau_{k+1} = \tau_k + \mu_\tau e(k) \sum_{i=-(M-1)/2}^{(M-1)/2} \text{sincd}(i) x_r(k - i; \tau_k) \quad (10b)$$

$$\tau_{k+1} = \tau_k + \mu_\tau e(k) \sum_{i=-(M-1)/2}^{(M-1)/2} LUT(i) x_r(k - i; \tau_k) \quad (11b)$$

$$\varepsilon^{pre-eq}(k) = e(k) \sum_{i=-(M-1)/2}^{(M-1)/2} x_r(k - i; \tau_k) \text{sincd}(i) \quad (11c)$$

In FIG. 4, a block diagram shows an implementation of the LMS timing offset determination block 212 in FIG. 2 for the pre-equalizer configuration. This implementation uses a one-dimensional lookup table 400 of M values for the function sincd(.) as described above. Input samples 401 are passed through series of M delay elements 402 (e.g., buffers, accumulators), are multiplied with entries of the lookup table 400, the multiplication results added to form a summation 404. The summation 404 is multiplied by $\mu_\tau$ 406 and e(k) 408 as in Expression (11b), as well as being added to the previous value of $\tau$, as indicated by delay element 410. The resulting output 412 is the timing offset for the current sample, $\tau_{k+1}$. The value of M in this example is defined during design of the system, and should be the same as the value of M shown in the interpolator of FIG. 3.

Figure 5:
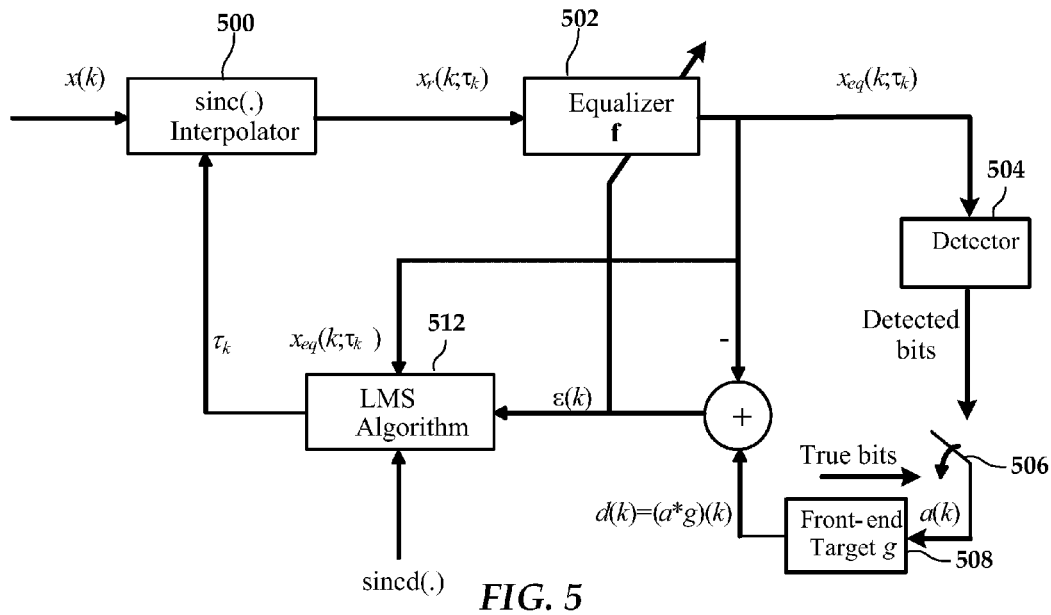
FIGS. 5 and 6 are block diagrams of post-equalizer timing adjustment processors according to example embodiments.
Figure 6:
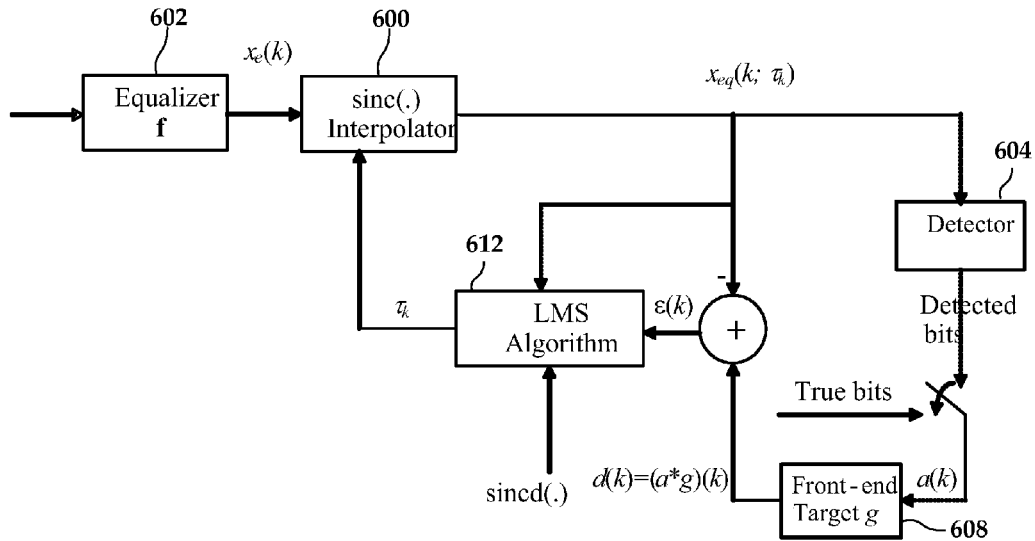

Post-equalizer configurations are now discussed, details of which are shown in FIGS. 5-6. In FIG. 5, a block diagram illustrates a post-equalizer timing adjustment processor according to a first embodiment, in which equalization occurs after time adjustment, and in which time corrected signals are used to estimate error. An interpolator 500 receives signal samples x(k) from an ADC. The output of the interpolator 500 includes timing-corrected samples $x_r(k)$ that are processed by an equalizer 502, e.g., an adaptive FIR or infinite impulse response (IIR) filter. The equalizer 502 partially compensates for the channel impulse response, the equalized output $x_{eq}(k)$ being input to a detector 504. The detected bits a(k) are fed back for purposes of adjusting the interpolator 500. As indicated by switching element 506, either the detected bits or a known pattern of bits (true bits 508) can be used for this purpose.

As with the pre-equalizer case shown in FIG. 2, the adaptive ADC-retiming processor of FIG. 5 adjusts the timing offset in the ADC samples before they pass through the equalizer 502, and so the adjusted (interpolated) ADC signal $x_r(k;\tau_k)$ is given by Expression (1) previously discussed. In contrast to the pre-equalizer case, the equalized signal $x_{eq}(k)$ and the desired signal d(k) (see Expression (13)) are used to determine the error of the signal. As such, the functional of Expression (12) below with respect to the timing offset, where $x_{eq}(k)$ is the equalized signal, $f_i$ are the equalizer taps, L is the number of taps in the equalizer (here we are assuming that the equalizer is of FIR type), and d(k) is the desired signal given as the convolution of the front-end target g(k) of length $L_g$ and the NRZ bit sequence {a(k)}. The front-end target is the impulse response of an FIR filter whose (desired) output should match the output of the equalizer in the minimum mean square (MMSE) sense. Such an equalization is called partial response equalization (PRE). Front end target block 508 in FIG. 5 performs the convolution to obtain desired signal d(k).

$$F(\tau) = E[(d(k) - x_{eq}(k; \tau))^2] \quad (12)$$

$$= E\left[\left(d(k) - \sum_{i=-(L-1)/2}^{(L-1)/2} f_i x_r(k - i; \tau)\right)^2\right]$$

$$= E[\varepsilon^2(k)]$$

$$d(k) = \sum_{i=0}^{L_g-1} g(i) a(k - i) \quad (13)$$

As in the pre-equalizer case, notice here also that the NRZ bit sequence {a(k)} may be given as the true sequence during the acquisition phase or as a detected sequence from the detector during the tracking phase of the timing recovery. For the adaptive algorithm the instantaneous functional shown below in Expression (14) will be minimized. The gradient of (14) with respect to the parameter τ is shown in Expression (15), where sincd(j+τ) is the derivative of sinc (j+τ) with respect to τ and is given as shown in Expression (16).

$$F_{ins}(\tau) = \left(d(k) - \sum_{i=-(L-1)/2}^{(L-1)/2} f_i x_r(k-i; \tau)\right)^2 \quad (14)$$

$$= \left(d(k) - \sum_{i=-(L-1)/2}^{(L-1)/2} f_i \sum_j x(k-i-j)\mathrm{sinc}(j+\tau)\right)^2$$

$$= \varepsilon^2(k)$$

$$\frac{\partial F_{ins}(\tau)}{\partial \tau} = 2\varepsilon(k) \frac{\partial(k)}{\partial \tau} \quad (15)$$

$$= -2\varepsilon(k) \left(\sum_j \mathrm{sincd}(j+\tau) \sum_{i=-(L-1)/2}^{(L-1)/2} f_i x(k-i-j)\right)$$

$$\mathrm{sincd}(j+\tau) = (\cos[\tau(j+\tau)] - \mathrm{sinc}(j+\tau))/(j+\tau) \quad (16)$$

The adaptive algorithm for τ takes the form shown in Expression (17) below, where $\mu_\tau$ is the step size for the timing offset update. Replacing (15) into (17) will give Expression (18a).

$$\tau_{k+1} = \tau_k + \mu_\tau \left(-\frac{\partial F_{ins}(\tau)}{\partial \tau}\right)_{\tau=\tau_k} \quad (17)$$

$$\tau_{k+1} = \tau_k + \mu_\tau \varepsilon(k) \sum_j \mathrm{sincd}(j+\tau_k) \sum_{i=-(L-1)/2}^{(L-1)/2} f_i x(k-i-j) \quad (18a)$$

Here the FIR equalizer tap vector $f=[f(-(L-1)/2), \ldots, f(-1), f(0), f(1), \ldots, f(L-1)/2)]^T$ may also be updated in time via LMS algorithm shown in Expression (18b), where $\mu_f$ is the LMS step size and the input data vector $x_r(k;\tau)=[x_r(k+(L-1)/2; \tau), \ldots, x_r(k+1; \tau), x_r(k; \tau), x_r(k-1; \tau), \ldots, x_r(k-(L-1)/2; \tau)]^T$.

$$f^{(k+1)} = f^{(k)} + \mu_f \varepsilon(k) x_r(k;\tau) \quad (18b)$$

To avoid performing a double convolution for each update of τ in (18a), the latter may be re-written as shown in Expression (19), where M is the order of the interpolation filter and the function sincd(j) (as given in Expression (7) or (16) with $-(M-1)/2 \le j \le (M-1)/2$), can be generated as a lookup table LUT(j) with one single row of M values. In this case, Expression (19) becomes Expression (20). From (18)-(20), the timing error function for this case is given by Expression (20a).

$$\tau_{k+1} = \tau_k + \mu_\tau \varepsilon(k) \sum_{j=-(M-1)/2}^{(M-1)/2} \mathrm{sincd}(j) \sum_{i=-(L-1)/2}^{(L-1)/2} f_i^{(k)} x_r(k-i-j; \tau_k) \quad (19)$$

$$= \tau_k + \mu_\tau \varepsilon(k) \sum_{j=-(M-1)/2}^{(M-1)/2} \mathrm{sincd}(j) x_{eq}(k-j; \tau_k)$$

$$\tau_{k+1} = \tau_k + \mu_\tau \varepsilon(k) \sum_{j=-(M-1)/2}^{(M-1)/2} LUT(j) x_{eq}(k-j; \tau_k) \quad (20)$$

$$\varepsilon^{post-eq}(k) = \varepsilon(k) \sum_j \mathrm{sincd}(j) x_{eq}(k-j; \tau_k) \quad (20a)$$

$$= \varepsilon(k) \sum_{j=-(M-1)/2}^{(M-1)/2} LUT(j) x_{eq}(k-j; \tau_k)$$

The sinc interpolation block 500 may use the same structure and lookup table as seen in FIG. 3. Similarly, the LMS algorithm block 512 may use the same structure as shown in FIG. 4, except that the input samples 401 are equalized as indicated by Expression (20), e.g., $x_{eq}(k+(M-1)/2+\tau_k)$. Also, the input 408 shown in FIG. 4 will be $\epsilon(k)$ instead of e(k).

A second embodiment of a post-equalizer timing adjustment processor is shown in the block diagram of FIG. 6. In this configuration the FIR equalizer 602 is outside the timing adjustment loop. The timing adjustment loop includes interpolator 600, detector 604, front-end target block 608, and LMS algorithm block 612. In this case the timing loop has less delay than the post-equalizer configuration shown in FIG. 5. The only delay here is due to the interpolator 600. The functional to be minimized here is a variant of (14) and given by Expression (21) below, where $x_e(k)$ is the equalized signal before interpolation $$F_{ins}(\tau) = \left(d(k) - \sum_{i=-(M-1)/2}^{(M-1)/2} \mathrm{sinc}(i+\tau) x_e(k-i)\right)^2 \quad (21)$$

$$= \left(d(k) - \sum_{i=-(M-1)/2}^{(M-1)/2} \mathrm{sinc}(i+\tau) \sum_j f_j x(k-i-j)\right)^2$$

$$= \varepsilon^2(k)$$

Following the same process as with the pre-equalizer embodiment, the timing offset may be estimated using a gradient-based LMS adaptation algorithm shown in Expression (22) below. Again here sincd(.) is the derivative of the sinc(.) function as defined by Expressions (7) and (16). To operate within the range of the "sincd" lookup table, Expressions (22) may be re-written as shown in Expression (23). The interpolation block 600 may use the same structure and lookup table as seen in FIG. 3, except that the input 301 is $x_e(k+(M-1)/2+\tau_k^I)$ and the output 304 is $x_{eq}(k,\tau)$. Similarly, the LMS algorithm block 612 may use the same structure as shown in FIG. 4, except that the input samples 401 are equalized as indicated by Expression (20), e.g., $x_{eq}(k+(M-1)/2+\tau_k)$. Also, the input 408 shown in FIG. 4 will be $\epsilon(k)$ instead of e(k)

$$\tau_{k+1} = \tau_k + \mu_\tau \varepsilon(k) \sum_{i=-(M-1)/2}^{(M-1)/2} \mathrm{sinc}d(i + \tau_k) x_e(k-i) \quad (22)$$

$$\tau_{k+1} = \tau_k + \mu_\tau \varepsilon(k) \sum_{i=-(M-1)/2}^{(M-1)/2} \mathrm{sinc}d(i + \tau_k^F) x_e(k-i+\tau_k^I) \quad (23)$$

Figure 7:
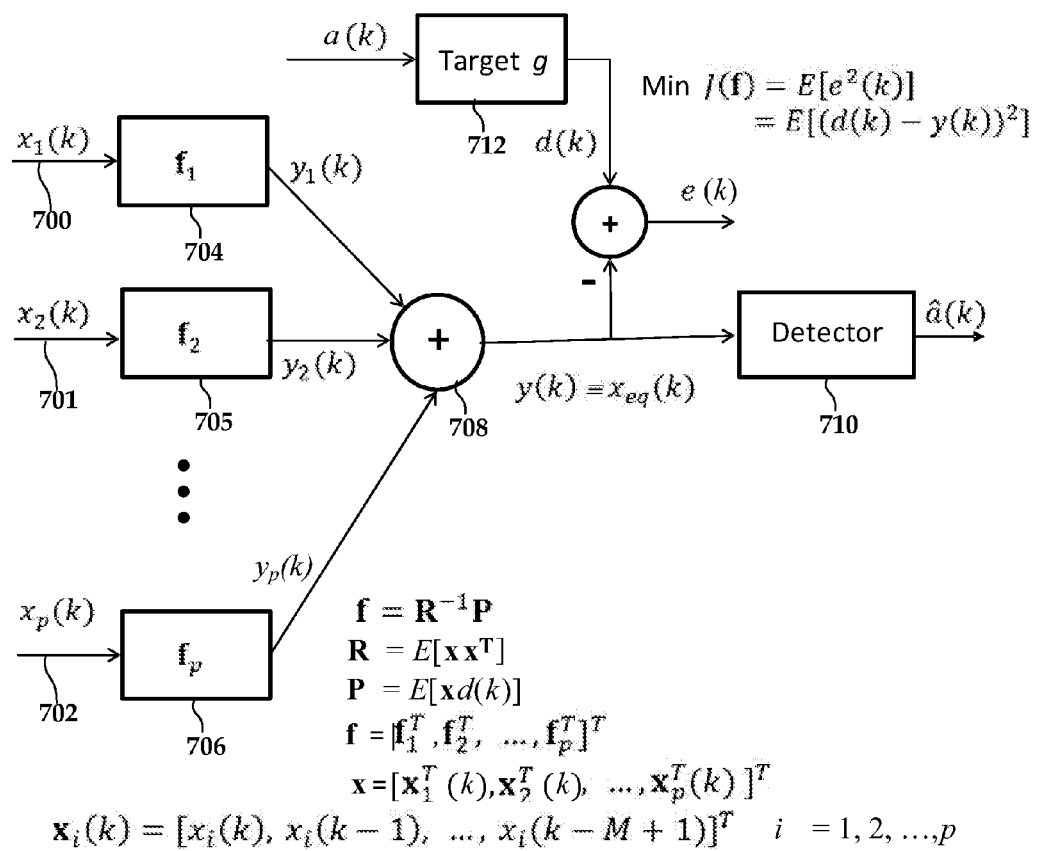
FIG. 7 is a diagram of a multiple input, single output read channel according to an example embodiment.

The examples presented above are shown being used in single-input, single output (SISO) read channels, where a single magnetic sensor signal is read to produce a single output stream of data. These concepts may also be used in a multi-sensor magnetic recording (MSMR) configuration. Generally, an MSMR device may include two or more read sensors on a single head, such as those used by two-dimensional magnetic recording (TDMR) data storage devices. In an MSMR device, the read channel is provided with multiple reads from multiple devices (e.g., readers, sensors). These reads are then combined using a multi-input single-output (MISO) equalizer, after which the process of detection and decoding continues as in the conventional channel with one reader. A block diagram of a MISO read channel according to an example embodiment is shown in the block diagram of FIG. 7.

A two or more input samples 700-703 are received, e.g., from two or more ADCs which each sample a different signal from separate read sensors. The samples 700-703 are equalized via equalizers 704-706 and combined via summation element 708. The combined equalized signal is sent to a detector 710. A front-end target block 712 performs a convolution to obtain a desired signal d(k), which is used to estimate error e(k).

Figure 8:
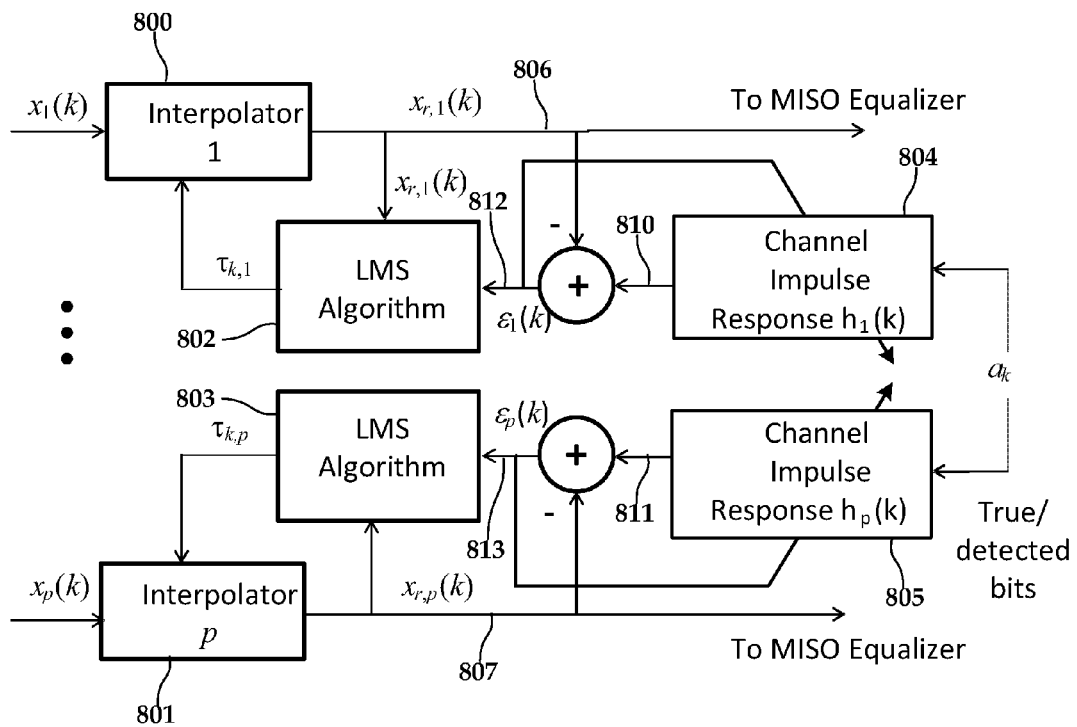
FIG. 8 is a diagram of a multiple input, single output pre-equalizer timing adjustment processor according to an example embodiment.
Figure 9:
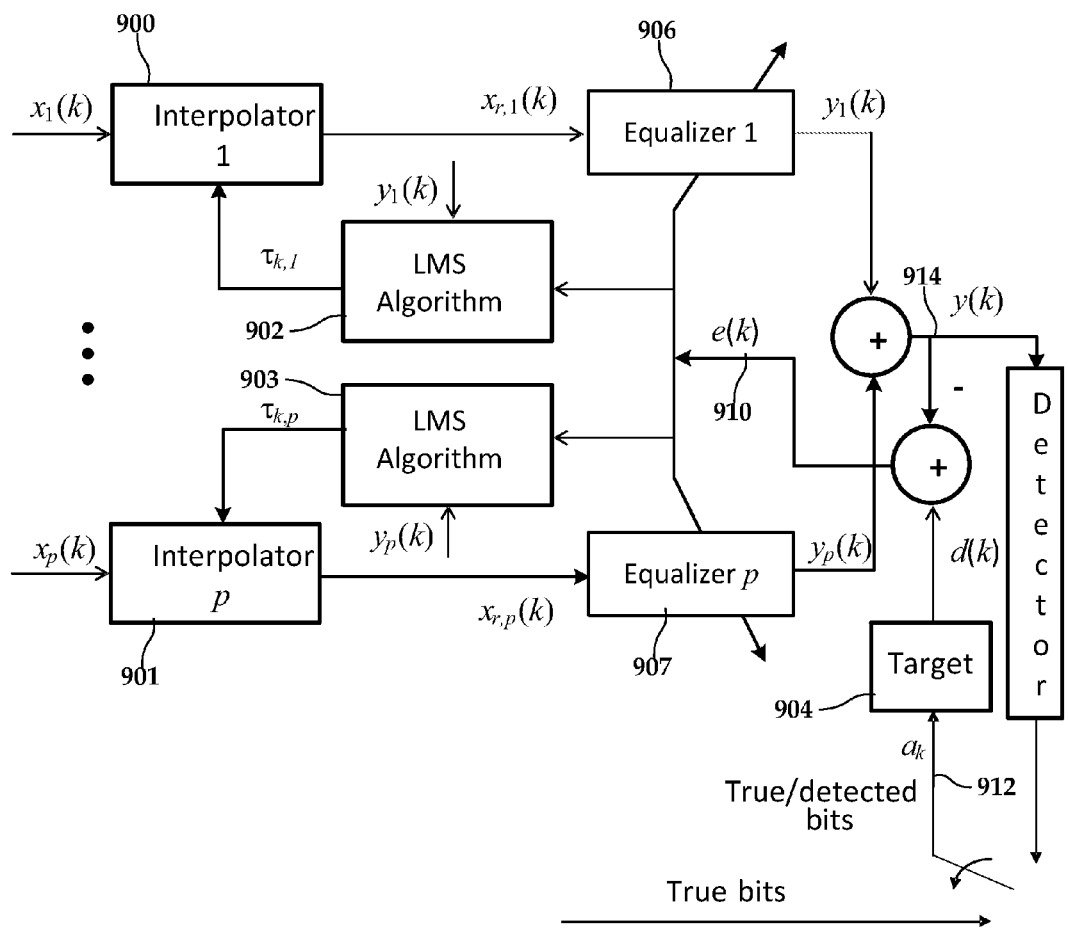
FIG. 9 is a diagram of a multiple input, single output post-equalizer timing adjustment processor according to an example embodiment.

The ADC-retiming algorithms described above can be extended to MSMR read channels. In such a case, the adaptation of the timing offset can be driven by a common error for all MSMR channels. Either of pre-equalizer retiming and post-equalizer retiming can be used for MSMR. In FIG. 8, a block diagram illustrates an example of a pre-equalizer scheme for MSMR for an arbitrary number p of channels. Each of the p-channels process samples $x_1(k)$ to $x_p(k)$, respectively. The retiming may be independently performed for each MSMR channel by interpolators 800, 801 using timing offsets determined by LMS timing offset blocks 802, 803. The timing adjusted samples $x_{r,1}(k)$ to $x_{r,p}(k)$ 806, 807 are processed collectively by a MISO equalizer (not shown). The MISO equalizer may include a bank of SISO equalizers combined by a summation at the output. In FIG. 9 the MISO equalizer is the combination of SISO equalizers 906-907. The detected bits a(k) are processed by blocks 804, 805 to convolve the detected bits with respective channel-specific impulse responses $h_1(k)$-$h_p(k)$. The outputs 810, 811 of the blocks 804, 805 are used to determine channel-specific errors $\epsilon_1(k)$-$\epsilon_p(k)$ 812, 813. For each channel, the timing offset adaptation is given by Expressions (9b)-(11b) above.

In FIG. 9, a block diagram illustrates a post-equalizer MSMR timing offset processor according to an example embodiment. Interpolators 900, 901 use timing offsets determined by LMS timing offset blocks 902, 903. The LMS timing offset blocks 902, 903 receive a single error estimate e(k) 910. The error estimate e(k) 910 is obtained as the difference between the desired signal d(k) and the overall equalized signal y(k), where d(k) is obtained by convolving the detected/true bits a(k) 912 with a front-end target 904. The error estimate is also used by channel-specific, adaptive equalizers 906, 907.

For the post-equalizer scheme, the criterion to be optimized takes the form shown in Expression (24) below, where p is the number of readers and $x_m(k)$ and $x_{r,m}(k)$ are the ADC signals from the mth reader before and after retiming, respectively. The signals $y_m(k)$, m=1, 2, ..., p, are the individual equalized signals and y(k) is the overall equalized signal at the output of MISO equalizer.

$$F(\tau_1, \tau_2, \ldots, \tau_m) = E[(d(k) - y(k))^2] \quad (24)$$

$$= E\left[\left(d(k) - \sum_{m=1}^{p} y_m(k)\right)^2\right]$$

$$= E\left[\left(d(k) - \sum_{m=1}^{p} \sum_{i} f_{i,m} x_{r,m}(k-i; \tau_m)\right)^2\right]$$

$$= E\left[\left(d(k) - \sum_{m=1}^{p} \sum_{i} f_{i,m} \sum_{j} \mathrm{sinc}(j + \tau_m)\right.\right.$$

$$\left.\left. x_m(k - i - j; \tau_m)\right)^2\right]$$

$$= E[\varepsilon^2(k)]$$

An instantaneous version of (24) may be given as Expression (25) below, which can be optimized with respect to the timing offset vector $\tau=(\tau_1, \tau_2, \ldots, \tau_p)$. The differentiation of (25) with respect to $\tau$ gives Expression (26). The adaptation of the mth timing offset may be performed using Expression (27), which can be expanded as seen in Expression (28).

$$F_{ins}(\tau_1, \tau_2, \ldots, \tau_p) = \left(d(k) - \sum_{m=1}^{p} \sum_{i} f_{i,m} \sum_{j} \mathrm{sinc}(j + \tau_m)\right. \quad (25)$$

$$\left. x_m(k - i - j)\right)^2$$

$$= \varepsilon^2(k)$$

$$\frac{\partial F_{ins}(\tau)}{\partial \tau_m} = 2\varepsilon(k) \frac{\partial \varepsilon(k)}{\partial \tau_m} \quad (26)$$

$$= -2\varepsilon(k)\left(\sum_{j} \mathrm{sinc}d(j + \tau_m) \sum_{i} f_{i,m} x_m(k - i - j)\right),$$

$$m = 1, 2, \ldots, p$$

$$\tau_{k+1,m} = \tau_{k,m} + \mu_{\tau,m}\left(-\frac{\partial F_{ins}(\tau)}{\partial \tau_m}\right)_{\tau=\tau_{k,m}}, m = 1, 2, \ldots, p \quad (27)$$

$$\tau_{k+1,m} = \quad (28)$$

-continued $$\tau_{k,m} + \mu_{\tau,m}\varepsilon(k) \sum_{j=-(M-1)/2}^{(M-1)/2} \text{sinc}d(j+\tau_{k,m}) \sum_{i=-(L-1)/2}^{(L-1)/2} f_{i,m}x_m(k-i-j),$$

$$m = 1, 2, \ldots, p$$

Here again, the FIR equalizer tap vector $f_m=[f_m(-(L-1)/2), \ldots, f_m(-1), f_m(0), f_m(1), \ldots, f_m((L-1)/2)]^T$ may also be updated in time via the LMS algorithm as shown in Expression (29), where $\mu_{f,m}$ is the LMS step size and $x_{r,m}(k; \tau)=[x_{r,m}(k+(L-1)/2; \tau), \ldots, x_{r,m}(k+1; \tau), x_{r,m}(k; \tau), x_{r,m}(k-1; \tau), \ldots, x_{r,m}(k-(L-1)/2; \tau)]^T$ is the equalizer input data vector from the mth reader. To avoid performing a double convolution for each update of $\tau_m$ in (28), the latter may be re-written as shown in Expression (30).

$$f_m^{(k+1)} = f_m^{(k)} + \mu_{f,m}\varepsilon(k)x_{r,m}(k;\tau_m), m=1,2,\ldots,p \quad (29)$$

$$\tau_{k+1,m} = \tau_{k,m} + \mu_{\tau,m}\varepsilon(k) \sum_{j=-(M-1)/2}^{(M-1)/2} \text{sinc}d(j) \sum_{i=-(L-1)/2}^{(L-1)/2} \quad (30)$$

$$f_{i,m}^{(k)}x_{r,m}(k-i-j;\tau_{k,m})$$

$$= \tau_{k,m} + \mu_{\tau,m}\varepsilon(k) \sum_{j=-(M-1)/2}^{(M-1)/2} \text{sinc}d(j)y_m(k-j;\tau_{k,m}),$$

$$m = 1, 2, \ldots, p$$

Figure 10:
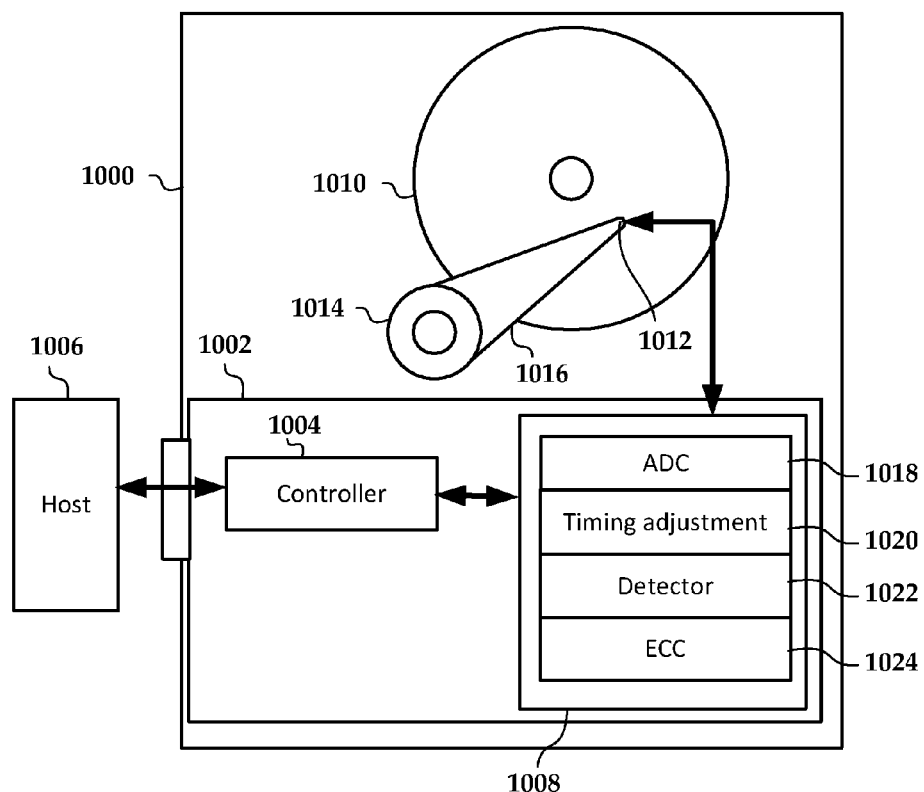
FIG. 10 is a block diagram of an apparatus according to an example embodiment.

While the timing recovery schemes described herein may be used in any data communications channel, one application in which these schemes are contemplated for use is in persistent data storage systems such as hard disk drives. In FIG. 10, a block diagram illustrates a data storage system according to an example embodiment. A data storage apparatus 1000 includes logic circuitry 1002 used to read data from and write data to one or more magnetic disks 1010. The magnetic disks 1010 may be configured as conventional (e.g., perpendicular) magnetic media, heat-assisted magnetic recording media, bit-patterned media, etc. The logic circuitry 1002 includes one or more controllers 1004 that perform operations associated with storing and retrieving data from the disks 1010. The operations include processing read and write commands that originate from a host device 1006. The host device 1006 may include any electronic device that can be communicatively coupled to store and retrieve data from a data storage device, e.g., a computer, peripheral bus card, factory testing apparatus, etc.

The controller 1004 is coupled to a read/write channel 1008 that processes data read from and written to the magnetic disks 1010. The read/write channel 1008 generally converts data between the digital signals processed by the controller 1004 and the analog signals conducted through one or more read/write heads 1012 (also referred to as a recording head). The read/write heads 1012 are positioned over the magnetic disks 1010 via a servo motor 1014 (e.g., voice coil motor) that moves one or more arms 1016 to which the read/write heads 1012 are mounted. Each of the read/write heads 1012 include one or more read transducers that detect changes in magnetic flux on the disk, and in response provide analog signals to the read/write channel 1008.

The read/write channel 108 includes one or more ADCs 1018 that sample the analog data at the appropriate time intervals (e.g., baud rate sampling, oversampling) and provide a digital value represented of the signal at each interval. This sampling may occur on one signal at a time, or multiple signals (e.g., MISO). A timing adjustment processor 1020 helps ensure that samples processed by a detector 1022 are in desired time synchronization. The detector 1022 determines the values of bits encoded in the signal using any detection/decoding scheme known in the art, such as a Viterbi algorithm. The detected bits are passed on to higher levels of processing, such as an error correction module 1024. The error-correction module 1024 may utilize extra data encoded on the disk 1010 that can be used with an error-correction code (ECC) to verify the data has been accurately read and to correct the data if decoding errors have been found.

Figure 11:
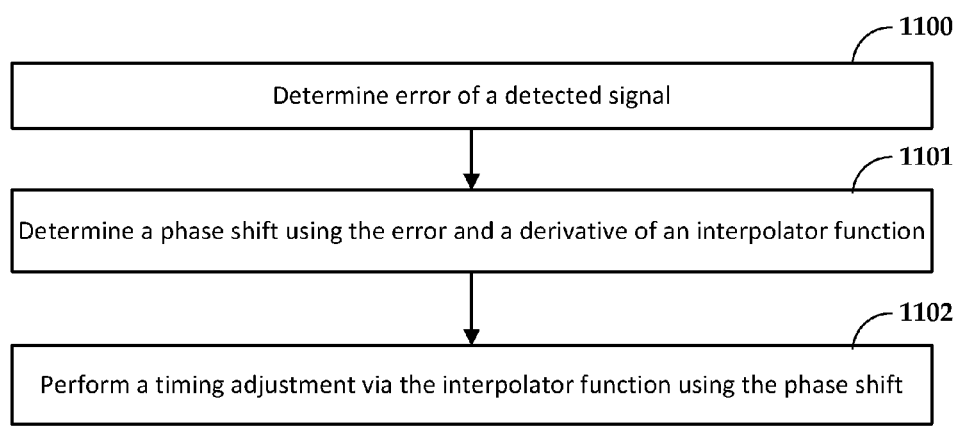
FIG. 11 is a flowchart of a method according to an example embodiment.

In FIG. 11, a flowchart illustrates a method according to an example embodiment. The method involves determining 1100 an error of a detected signal based a time-adjusted digitized signal. The time-adjusted signal is provided from an interpolator that adjusts the phase of a digitized signal received from an ADC. A corrective phase shift of the digitized signal is determined 1101 via a least-mean-squared processing block that uses a derivative of a function used by the interpolator as well as the error of the detected signal. The phase shift is input to the interpolator to perform 1102 the timing adjustment.

Two timing recovery schemes are described in this disclosure. In one scheme, the timing adjustment is performed on the ADC samples (through interpolation) before the equalizer, e.g., without involving the equalized samples themselves. In another scheme, the timing adjustment is performed on the ADC samples (through interpolation) using a feedback from the equalizer output. Although the interpolating function shown in these examples is the sinc(.) function, there is no restriction on using any other interpolating functions in the timing adjustment (e.g., digital sinc function also known as Dirichlet function or some polynomial such as a spline interpolator). The two schemes may be applied in SISO or MISO mode. Based on some simulation experiments the two schemes presented here tend to adapt the timing offset very well and track very closely the true timing offset. It has also been found that the BER degradation due to timing jitter (either for pre-equalizer or post-equalizer schemes) is very small.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
an analog-to-digital converter; and
a timing adjustment processor that receives a digitized signal from the analog-to-digital converter, the timing adjustment processor configured to:
perform timing adjustment on the digitized signal via an interpolator;
determine an error of a detected signal based the time-adjusted digitized signal; and
determine a corrective phase shift of the digitized signal via a least-mean-squared processing block that uses the error and a derivative of an interpolation function performed by the interpolator, the interpolation function comprising one of a sinc function, a Dirichlet function, and a polynomial function, the phase shift being input to the interpolator to perform the timing adjustment, wherein at least one of the interpolation function and the derivative of the interpolation function are implemented as a lookup table.

2. The apparatus of claim 1, wherein the interpolation function comprises the sinc function.

3. The apparatus of claim 1, wherein the interpolation function is implemented as a two-dimensional lookup table.

4. The apparatus of claim 1, wherein the derivative of the interpolation function is implemented as a one-dimensional lookup table.

5. The apparatus of claim 1, further comprising an equalizer that equalizes the time-adjusted digitized signal after processing via the interpolator, wherein the time-adjusted digitized signal is convolved with a channel impulse response before being used by the least-mean-squared processing block.

6. The apparatus of claim 1, further comprising an equalizer that equalizes the time-adjusted digitized signal, wherein the error is determined based on the equalized, time-adjusted digitized signal, and wherein the least-mean-squared processing block determines the corrective phase shift further using the equalized, time-adjusted digitized signal.

7. The apparatus of claim 1, wherein the digitized signal is sampled at a baud rate of a recorded signal.

8. A method comprising:
processing a digitized signal via an interpolator, the interpolator performing timing adjustment on the digitized signal;
determining error of a detected signal based the time-adjusted digitized signal; and
determining a corrective phase shift of the digitized signal via a least-mean-squared processing block that uses the error and a derivative of an interpolation function performed by the interpolator, the interpolation function comprising one of a sinc function, a Dirichlet function, and a polynomial function, the corrective phase shift being input to the interpolator to perform the timing adjustment, wherein at least one of the interpolation function and the derivative of the interpolation function are implemented as a lookup table.

9. The method of claim 8, wherein the interpolation function comprises the sinc function.

10. The method of claim 8, wherein the interpolation function is implemented as a two-dimensional lookup table.

11. The method of claim 8, wherein the derivative of the interpolation function is implemented as a one-dimensional lookup table.

12. The method of claim 8, further comprising equalizing the time-adjusted digitized signal after processing via the interpolator, wherein the time-adjusted digitized signal is convolved with a channel impulse response before being used by the least-mean-squared processing block.

13. The method of claim 8, further comprising equalizing the time-adjusted digitized signal, wherein the error is determined based the equalized, time-adjusted digitized signal, and wherein the least-mean-squared processing block determines the corrective phase shift further using the equalized, time-adjusted digitized signal.

14. The method of claim 13, wherein the detected signal comprises the convolution of a bit sequence with a front-end target.

15. The method of claim 8, wherein the digitized signal is sampled at a baud rate of a recorded signal being processed by the interpolator.

16. The method of claim 8, wherein the derivative is implemented as a lookup table.

17. The method of claim 8, wherein the detected signal is output from a detector that converts the time-adjusted digitized signal to bits.

18. An apparatus comprising:
two or more analog-to-digital converters;
two or more timing adjustment processors that receive two or more digitized signals from the two or more analog-to-digital converters, the timing adjustment processors each configured to:
perform timing adjustment on the respective digitized signals via respective interpolation functions, the interpolation function comprising one of a sinc function, a Dirichlet function, and a polynomial function;
determine at least one error of a single detected signal based the respective time-adjusted digitized signals; and
determine respective corrective phase shifts of the digitized signals via respective least-mean-squared processing blocks using a derivative of the interpolation function and the at least one error, the corrective phase shifts being input to the respective interpolation functions; and
a detector that produces the single detected signal based on a combination of the time-adjusted digitized signals of the two or more timing adjustment processors.

19. The apparatus of claim 18, wherein the time-adjusted signals are equalized via channel-specific equalizers after the timing adjustment, outputs of the channel-specific equalizers being combined to form an overall equalized signal, and wherein the at least one error comprises a single error estimate based on the overall equalized signal.

20. The apparatus of claim 18, wherein the time-adjusted signals are equalized via a multiple-input, single-output equalizer after the timing adjustment, and wherein the at one error comprises two or more channel-specific errors obtained by convolving detected bits with respective channel-specific impulse responses.